(12) United States Patent
Schulze

(10) Patent No.: US 6,308,730 B1
(45) Date of Patent: Oct. 30, 2001

(54) GAS STREAM MONITOR

(75) Inventor: Klaus Schulze, Gernrode (DE)

(73) Assignee: Mertik Maxitrol GmbH & Co. KG, Thale (DE)

( * ) Notice: Subject to any disclaimer, the term of this patent is extended or adjusted under 35 U.S.C. 154(b) by 0 days.

(21) Appl. No.: 09/701,074

(22) PCT Filed: May 31, 1999

(86) PCT No.: PCT/EP99/03753

§ 371 Date: Nov. 21, 2000

§ 102(e) Date: Nov. 21, 2000

(87) PCT Pub. No.: WO99/63254

PCT Pub. Date: Dec. 9, 1999

(30) Foreign Application Priority Data

Jun. 2, 1998 (DE) .......................................... 298 09 839 U

(51) Int. Cl.[7] .................................................... F16K 31/14
(52) U.S. Cl. .......................... 137/495; 137/459; 137/460; 137/498; 137/517; 251/255; 251/83
(58) Field of Search ................................. 137/459, 460, 137/495, 498, 517; 251/83, 255

(56) References Cited

U.S. PATENT DOCUMENTS

| 3,794,077 | 2/1974 | Fanshier . |  |
|---|---|---|---|
| 4,319,604 | * 3/1982 | Bird | ........................................ 137/495 |
| 4,727,903 | * 3/1988 | Sturgis et al. | .................... 137/461 |
| 5,105,850 | 4/1992 | Harris . |  |
| 5,293,898 | * 3/1994 | Masloff | ................................ 137/517 |
| 5,613,518 | * 3/1997 | Rakieski | ............................ 137/513.5 |

FOREIGN PATENT DOCUMENTS

| 556863 | 10/1943 | (GB) . |
| 2247735 A | 3/1992 | (GB) . |
| WO 92/01184 | 1/1992 | (WO) . |

* cited by examiner

Primary Examiner—A. Michael Chambers
Assistant Examiner—Thomas L. McShane
(74) Attorney, Agent, or Firm—Harness, Dickey & Pierce, P.L.C.

(57) ABSTRACT

A gas stream monitor shall be provided that facilitates the adjustment of the reseat flow.

The gas stream monitor consists of a gas-tight casing whose interior is equipped with a seat for a reseat body that is movable inside the casing and is kept in open position against the flow direction by weight and/or spring force, in which the flow cross-section, surface area of the reseat body and the forces are determined in such a manner that gas stream monitor leaves its open position at a defined value of the reseat flow and is moved towards the seat of the casing, so that the gas conduit is closed in the shut position, and has outside the casing at least one manipulator to adjust the spring pre-tension and/or the stroke of the reseat body.

The gas stream monitor serves to automatically shut off gas conduits upon the occurrence of an inadmissible flow increase due to, e.g. a damaged gas conduit or a defective consumer.

16 Claims, 5 Drawing Sheets

GAS STREAM MONITOR

BACKGROUND AND SUMMARY OF THE INVENTION

The invention relates to a gas stream monitor that automatically shuts off gas conduits in the event of an inadmissible flow increase as specified in the introductory clause of the first patent claim.

Such gas stream monitors, employed in pipelines, e.g. upstream of gas valves, gas appliances, etc., are available in a large variety of designs. Their purpose is to discontinue gas supply if gas consumption exceeds a predefined value.

WO 92/01184, for instance, describes a gas stream monitor of the above-mentioned type which shuts a pipe system in case of damage but does not effect a premature shutting off of the supply line if a consumer requires the gas volume corresponding to its rated output over a longer period. One valve in this so-called safety shut-off mechanism is designed as a disk valve.

The set-up of this valve is as follows: the valve body is fixed to a valve shaft that is movably arranged on either side in slide bearings in axial valve direction and opposing the force of a spring. The valve disk is jointly acting with a valve seat supported by two flat rings which simultaneously serve as joints for the above-mentioned slide bearings. The flat rings are provided with cut-outs or breakthroughs.

The springiness of the spring and/or the reseating path of the valve are adjustable in order to exactly adapt the reseat flow to the type, nature and number of consumers. A nut is provided at the free end of the valve shaft for the adjustment of the reseating path of the valve, the nut is screwed to a thread on the valve shaft An adjusting device, e.g. a second nut between the two slide bearings, is provided to adjust the springiness.

An automatic shut-off valve is also known from GB Patent 556,863. This shut-off valve consists of a tubelike casing with threaded connections on either side. The casing is fitted with a flat ring with breakthroughs, which ring has at its centre a slide bearing for a longitudinally moving valve shaft with a valve gate at its end which acts together with a valve seat in the casing. A pressure spring, that is supported on one side by the valve gate and at the other by the flat ring, keeps the valve gate in the open position until the adjusted reseat flow is achieved. Also in this design the reseat flow is changed by a modification of the springiness adjustment by altering the tap depth of the valve shaft into a hood, and thus the installation length of the spring.

A valve described in U.S. Pat. No. 3,794,077 has a similar set-up. A pressure spring, with breakthroughs, supported on one side by a slide bearing at the casing and on the other by a nut screwed to the valve shaft keeps the valve gate in the open position until the adjusted reseat flow is achieved. Also there, a changing of the nut position, which is secured against turning with a pin, on the valve shaft the installation length of the pressure spring is altered and thus the reseat flow altered by a change of the springiness.

The disadvantage of all those solutions is that the reseat flow can only be adjusted by interior manipulations of the gas stream monitor and, hence, respective provisions have to be made already during manufacturing. This means, however, that already then the specific application, i.e. the technical parameters of the consumers downstream of the place of installation, have to be known. This is the reason why there are specific gas stream monitors available for each application.

The following happens in the known gas stream monitors: after a shut-off due to gas consumption in excess of the reseat flow, caused e.g. by a damaged gas conduit or a defective consumer, the gas stream monitor is re-opened after defect remediation by building up pressure on the consumer side until the valve disk is lifting from the valve seat and thus the flow cross-section is released again. This procedure, however, is often very time-consuming.

An overflow aperture in the valve disk is another possibility where, following the remediation of the defect and shutting of all consumers, the overflow aperture facilitates a pressure build-up in the consumer-side gas conduit until pressure compensation is reached and the gas stream monitor re-opens. The disadvantage is that, in an emergency case, a certain volume of leaking gas flows through the gas stream monitor even after it has been shut.

The invention is focusing on the issue of developing a gas stream monitor of the described type in which the adjustment/alteration of the reseat flow can also be made after its manufacturing. In particular, it should also be possible to change the reseat flow after the valve has been installed. According to the present invention the problem is solved by means of a gas stream monitor, consisting of a gas-tight casing, internally equipped with a seat for a reseating body that is movable inside the casing and is kept in the open position against the flow direction by its own weight and/or springiness, and where the flow cross-section, the surface of the reseating body and the forces are determined in such a manner that the gas stream monitor laves its open position upon a defined value of the reseat flow and is moved towards the casing seat so that the gas conduit is shut in the shut position, and that has, outside of the casing, at least a manipulator in the form of a tappet leading into the casing interior to adjust the spring pre-tension and/or the stroke of the reseating body.

Thus, a solution has been found that abolished the disadvantages of the prior art where the adjustment of the reseat flow was only possible by interference in the interior of the gas stream monitors, which is now already provided for during manufacturing.

Further advantageous arrangements of the invention are described in the other patent claims. It is, e.g., possible to arrange two or more reseat bodies in parallel inside the casing, each of which reseat bodies being assigned with a manipulator with a tappet leading into the casing interior to facilitate the adjustment of the spring pre-tension and/or the stroke of the reseat body.

It is particularly advantageous when the manipulator to adjust the pre-tension and/or the stroke of the reseat body can also be used to adjust the shut position of the reseat body. Thus, it is possible that this gas stream monitor can additionally act also as a shut-off valve.

Favourably for the adjustment/alteration of the reseat flow of the gas stream monitors the manipulator is supported by a sliding block which, e.g., can be equipped with lock-in positions for preferential values of the reseat flow.

A further arrangement of the invention is that the reseat body in the shut position can be moved out of the shut position by means of a key button operable from outside. Thus it is possible, following the remediation of the defect and shutting of all consumers, to initiate a pressure build-up in the consumer-side gas conduit until pressure compensation is achieved and the gas stream monitor remains open. An overflow aperture is not necessary and thus a gas-tight closure possible.

Particularly favourable is the embodiment in which the slide block has a control slope and the tappet is simultaneously interlocked with the reseat body shaft that, upon actuation of the manipulator, the reseat body is movable from its shut position by means of the control slope and the manipulator automatically leaves the range of action of the control slope. This solution does not require a separate key button since the key button function is integrated into the manipulator. Also the otherwise required through boring in the casing is not necessary.

In order to change the adjusting value of the reseat flow the reseat stroke can be altered in the place of a springiness alteration. This is possible since the connection between manipulator and tappet is adjustable, i.e. the insert or thread depth of the tappet can be altered.

BRIEF DESCRIPTION OF THE DRAWINGS

Below is a more detailed description of the invention by means of a practical example. The figures show the following.

DESCRIPTION OF THE PREFERRED EMBODIMENTS

Figure 1:
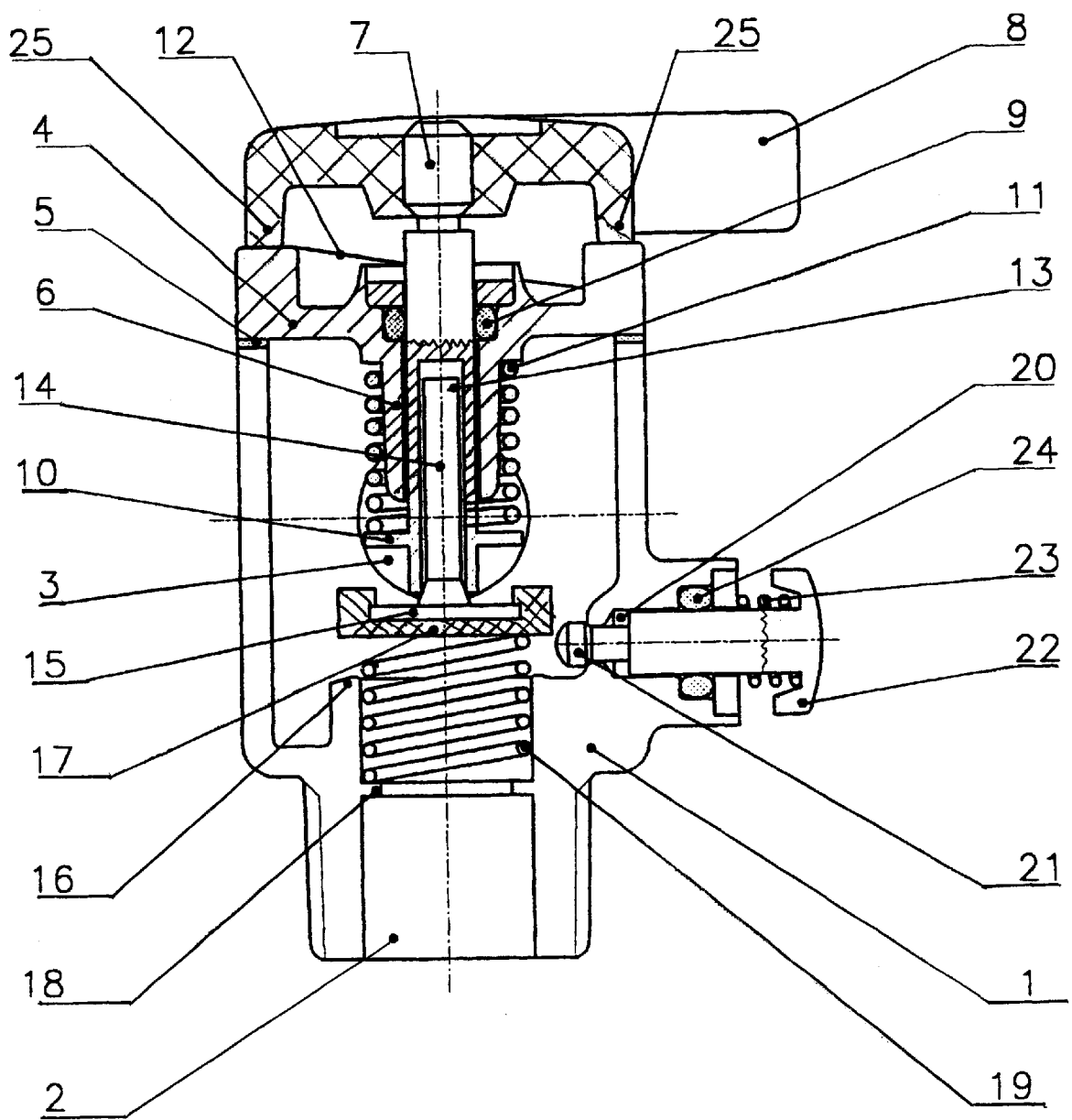
FIG. 1 shows a gas stream monitor according to the invention as a schematic sectional view in an open position.

The gas stream monitor according to the invention shown in FIG. 1 has a barrel-type casing 1 with a bottom-mounted gas outlet 2 and, in this practical example, a gas inlet 3 arranged at a right angle to it. Naturally, each have a connection for a gas conduit which, in this case, is a threaded connection at gas outlet 2. Other connections are, of course, also possible.

The casing 1 is closely covered with a gas-tight cover 4, e.g. by means of an intermediate flat packing 5. At its centre the cover 4 has a sleeve-type extension 6 that projects into the casing 1 and is preferably connected as one piece with the cover 4, in which a tappet 7 is guided so that it can longitudinally move and rotate, and whose end projecting from the cover 4 is equipped with a manipulator 8 that is firmly connected with the tappet 7. An O-ring 9 is located at the lead-through point of the tappet 7 through the cover 4 to ensure gas-tightness.

At its perimeter in the casing 1 but outside of the extension 6 the tappet 7 has a circumferential collar 10 which supports a pressure spring 1 1 whose other end presses against the cover 4. Thus, the manipulator 8, that has two opposing poles 25 for this purpose facing the cover 4, are non-positively drawn with the fronts of the poles 25 against a circular collar that serves as a stop and is located at the side of the cover 4 that is averted from the casing 1. The height is this collar is such that it forms in each case a slide block 12 for every pole 25 of the manipulator 8. Both slide blocks 12 are separated by a transverse slot that is not shown in the figure and whose function is explained elsewhere.

Figure 2:
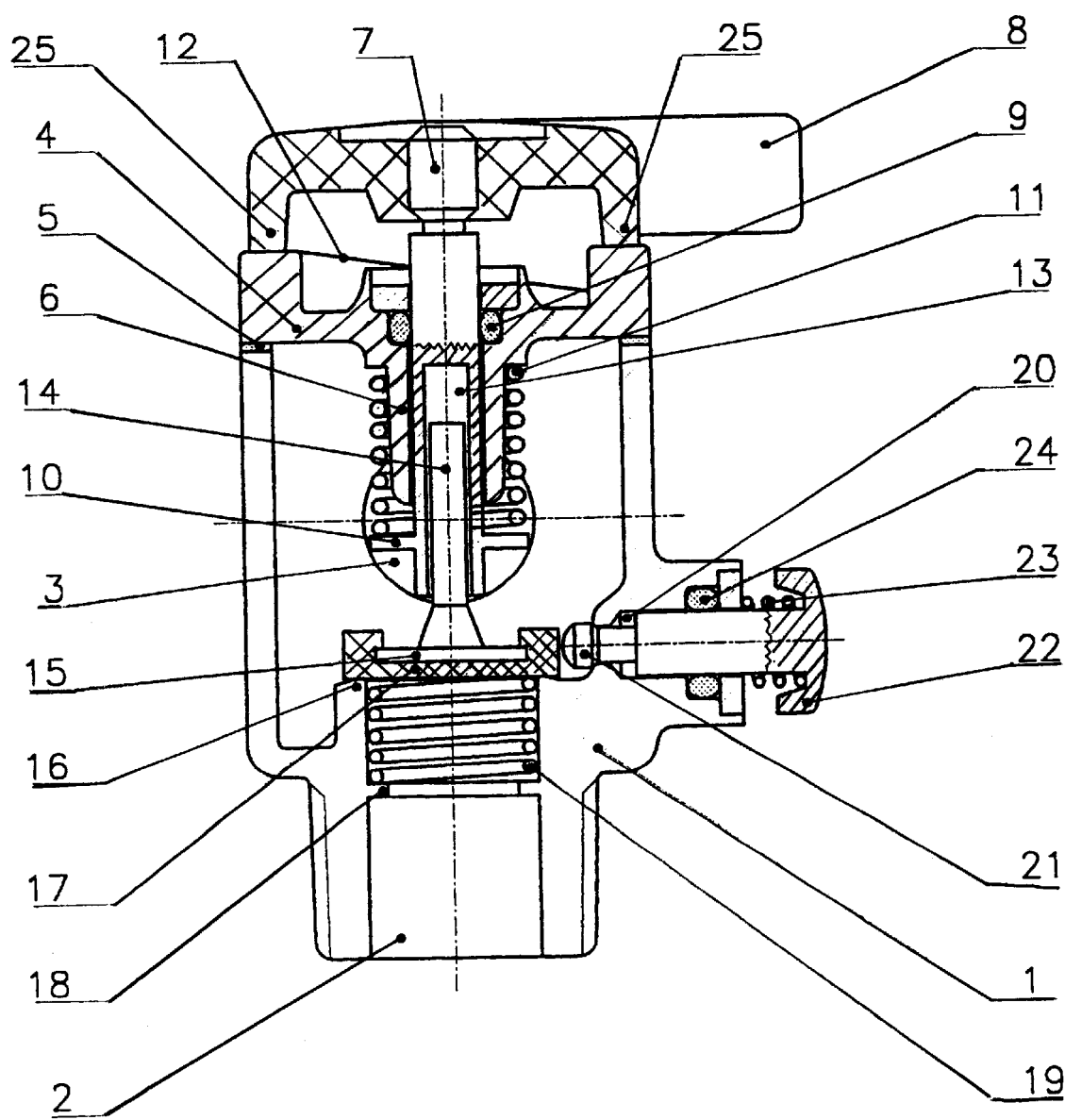
FIG. 2 shows a gas'stream monitor according to the invention as a schematic sectional view in a shut position.

The front end of the tappet 7 in the casing i is provided with a pocket boring 13, in which the lengthwise movable shaft 14 of a reseat body 15 is guided to which a valve seat 16 is assigned that is connected as one piece with the bottom of the casing 1 and by which the gas outlet 2 is tightly closed in shut position (FIG. 2). In order to ensure gas-tightness in any case the reseat body 15 has, at least in the sealing area, an additional elastic packing 17. In gas outlet 2 a pressure spring 19 is supported by a circumferential step 18 whose other end exerts pressure on the reseat body 15 in opening direction.

Figure 3:
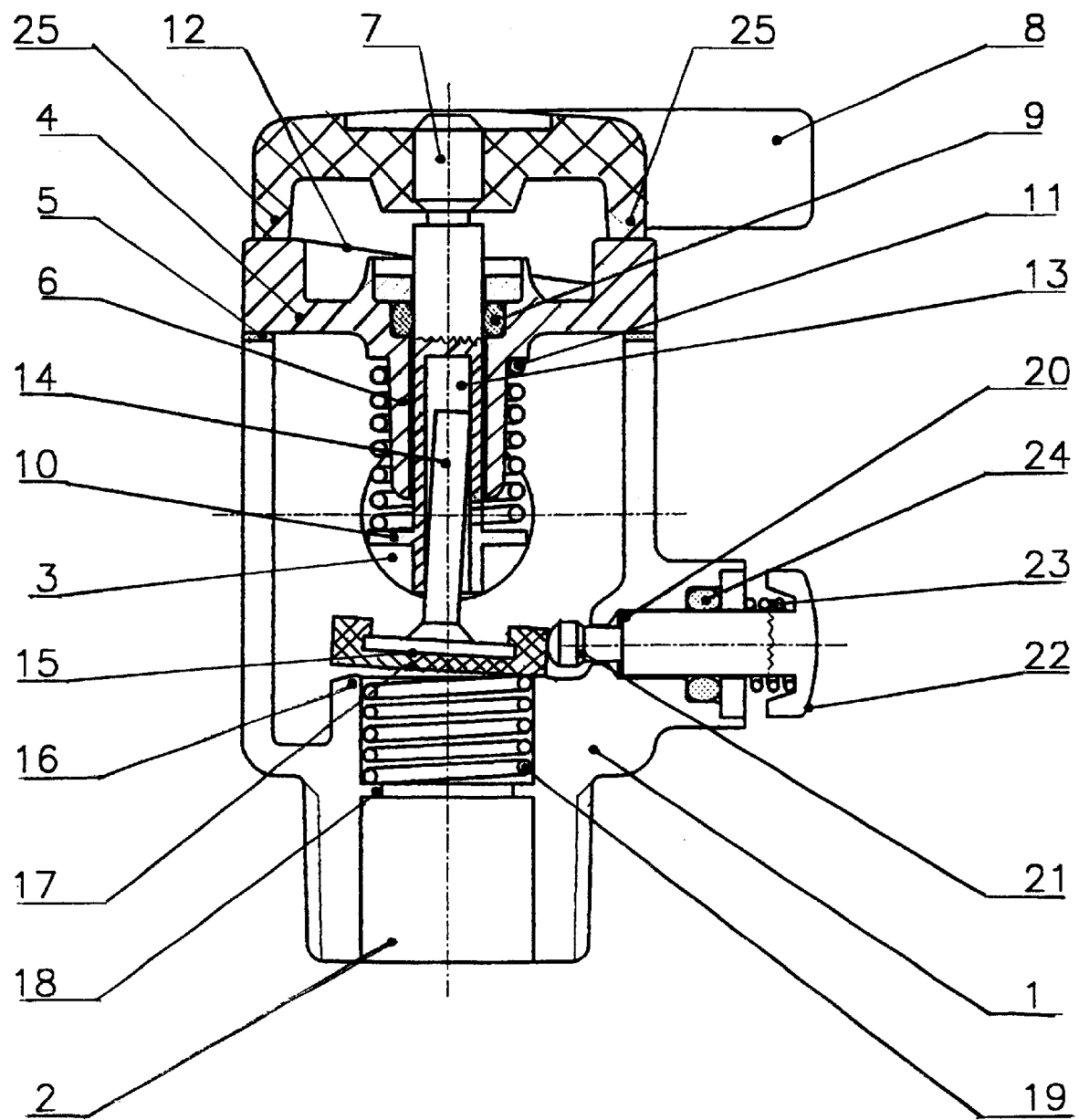
FIG. 3 shows a gas stream monitor according to the invention as a schematic sectional view in a shut position after actuation of the key button.

In addition, the casing 1 has at its perimeter a radial boring 20 at the elevation of the reseat body 15 in shut position into which a tappet 21 is inserted in a gas-tight manner, as in this practical example by using am O-ring 24, and can be moved by means of an outside actuated key button 22 against the force of a pressure spring 23 lengthwise so far that the lateral deflection of the reseat body 15 will cause an opening slot, despite its being in shut position (FIG. 3).

Figure 5:
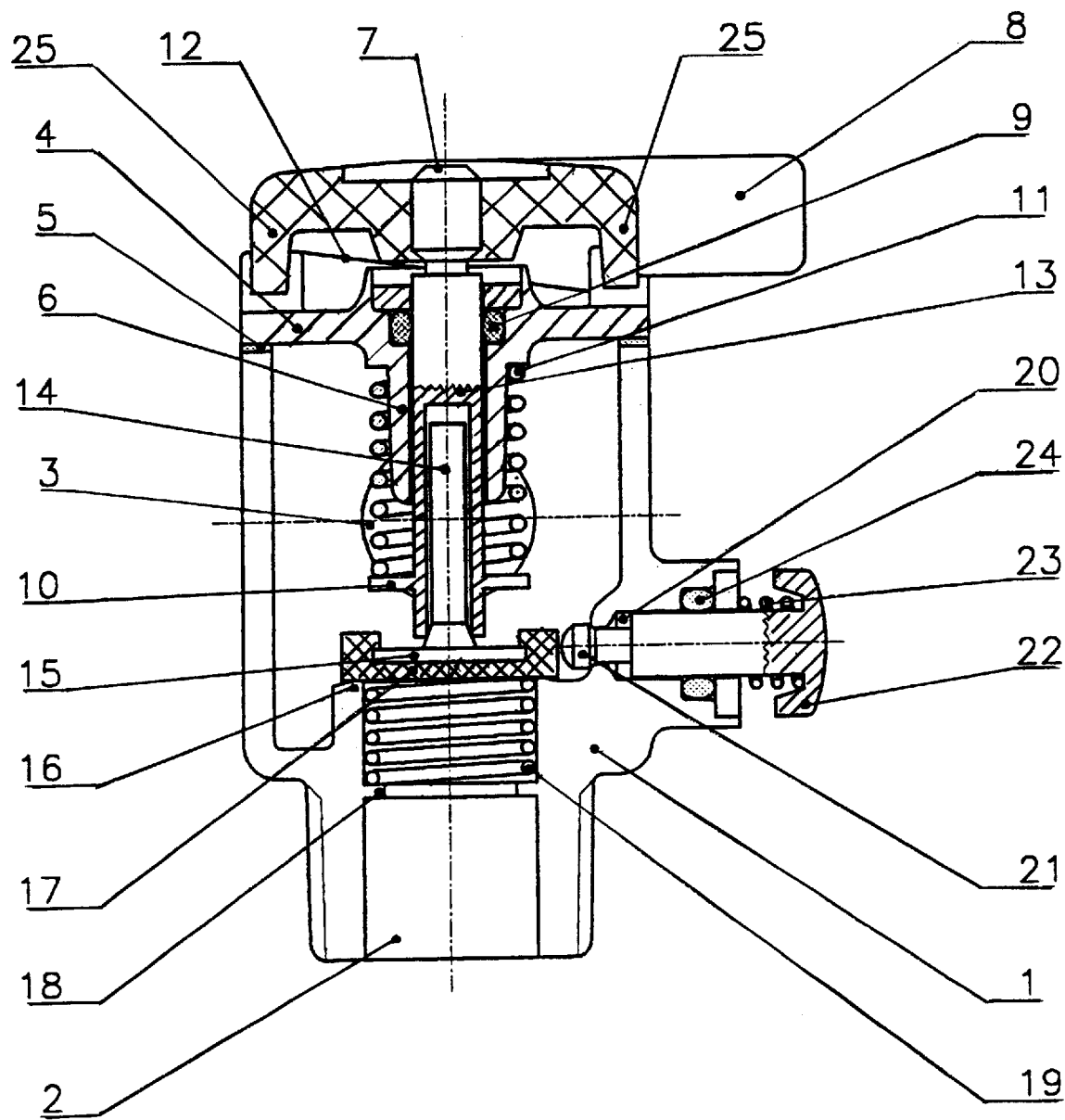
FIG. 5 shows a gas stream monitor according to the invention as a schematic sectional view in a shut position with stop valve.

The length of the tappet 7 is determined in such a way that its front is resting on the reseat body 15 and thus presses the latter into the shut position when the poles 25 are in the above-mentioned transverse slot of the cover 4. The area of the reseat body 15 which supports the tappet 7, i.e. in this case the transition of the reseat body 15 to the shaft 14, is formed in such a manner that in this shut position a lateral defection of the reseat body 15 by means of the key button 22 is safely prevented since there is no slack (FIG. 5).

Figure 4:
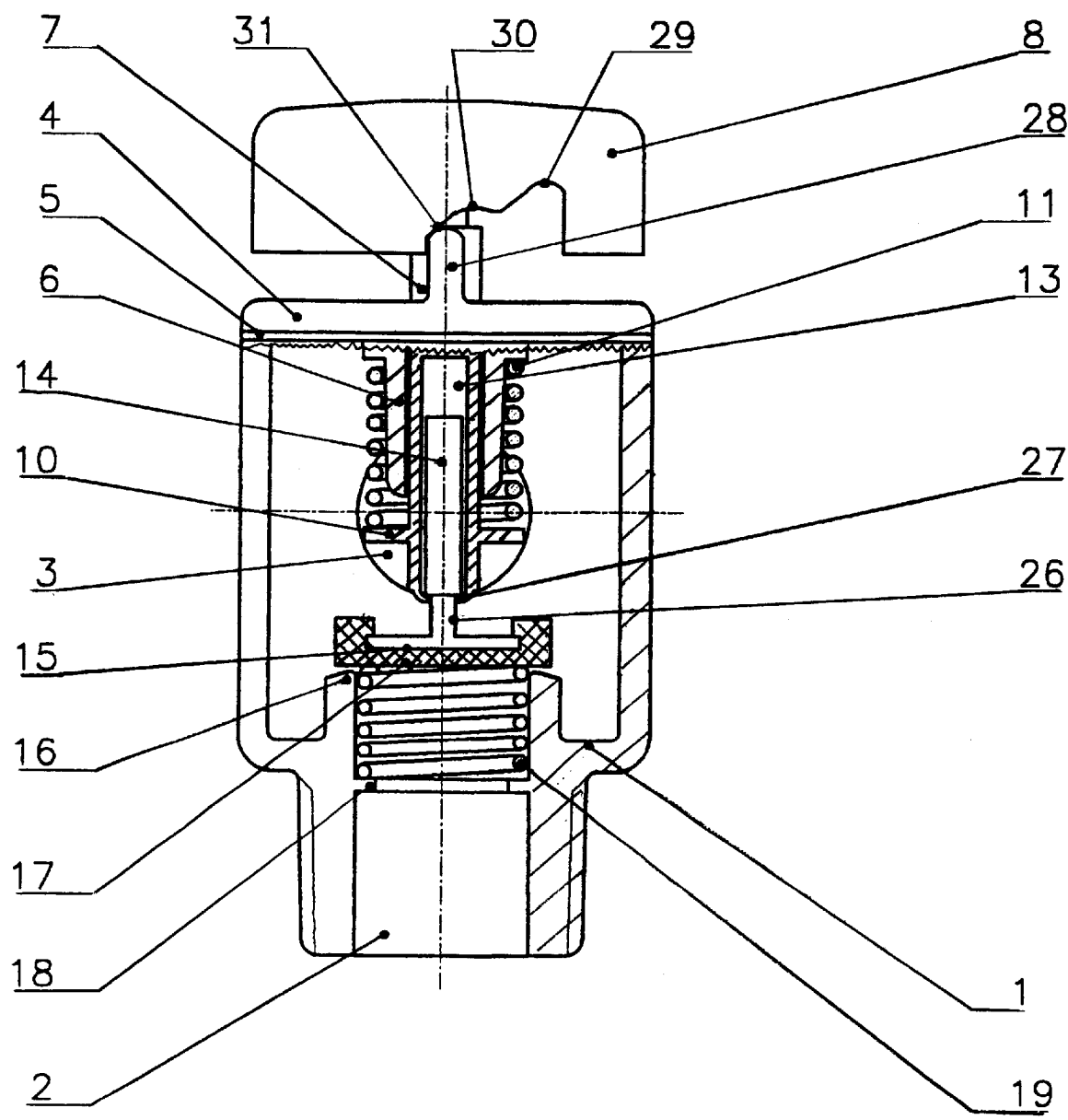
FIG. 4 shows a gas a stream monitor according to the invention as a schematic sectional a view in shut position with a different key button design.

FIG. 4 shows the gas stream monitor with a different key button design. The key button function is integrated into the manipulator 8 so that the boring 20 in the casing 1, that was necessary in the above practical example, is prevented. The shaft 14 of the reseat body 15 was provided with a contraction 26 in the transition area in which the internally cranked end 27 of t he tappet 7 can slide. Simultaneously the slide block 12 was located inside the manipulator 8. A web 28 attached to the cover 4 projects into the slide block 12.

In addition to the shut-off position 29 and, for the sake of clarity, in this practical example the only normal position 30 for the flow to be monitored the slide block 12 has a control slope 31.

The mode of action of the gas stream monitor according to the invention is as follows:

Normally the gas stream monitor is in the position shown in FIG. 1 where the reseat body 15 is kept in the open position by the pressure spring 19 and the existing differential pressure across the gas stream monitor. If there is a gas consumption in excess of the reseat flow, due to a damaged downstream gas conduit or a defective downstream consumer the differential pressure increase overcomes the force of the pressure spring 19 and the reseat body 15 moves into the shut position (FIG. 2). Gas supply is interrupted. After the remediation of the defect and shutting of all downstream consumers the key button 22 is actuated and the reseat body 15 laterally deflected and an opening slot is formed so that there is a pressure build-up on the consumer side that makes the reseat body 15 lift from the valve seat 16 (FIG. 3).

In the practical example in FIG. 4 the manipulator 8 is actuated in the place of the key button 22 in such a manner that the web 28 activates the control slope 31. Thus, the reseat body 15 is moved from out of its shut position by the end 27 of the tappet 7 positioned in the contraction 26 so that also an opening slot is formed with the above-mentioned consequences. Upon releasing the manipulator 8 the force of the pressure spring 11 deactivates the control slope 31 and the manipulator 8 is returned into its normal position 30.

A changing of the adjusted reseat flow requires the alteration of the position of the poles 25 at the slide block 12 assigned to them. The stroke of the tappet 7 that occurs when the manipulator 8 is turned shifts the open position of the reseat body 15 and thus changes the effective force of the pressure spring 19 which results in a correction of the reseat flow.

In order to shut off the gas conduit irrespective of consumption, i.e. perform the function of a shut-off valve, the manipulator 8 is to be turned until the poles 25 leave their slide block 12 and catch into the transverse slot. Thus the tappet 7 is moved under the impact of the pressure spring 11 until it rests on the reseat body 15 and the latter on the valve seat 16. The transition slope between reseat body 15 and shaft 14 simultaneously prevents the otherwise existing and necessary lateral slack so that the valve cannot be accidentally opened with the key button 22 (FIG. 5).

The gas stream monitor according to the invention is of course not restricted to the depicted practical example. There are rather alterations and modifications possible without leaving the scope of the invention. For instance, the connections can be modified or the change of the reseat flow can be mode by changing the location of the pressure spring 19 in the place of changing the stroke. Moreover, one casing can accommodate several gas stream monitors, naturally with their own gas outlets, or the slide block 12 can have lock-in positions.

The adjusted value of the reseat flow can also be changed by altering the reseat stroke in the place of the springiness. This is possible since the connection between manipulator and tappet is adjustable, i.e. the insert or thread depth of the tappet can be altered.

What is claimed is:

1. A gas stream monitor to automatically shut off gas conduits, consisting of a gas-tight casing (1) that has in its interior a valve seat (16) for a reseat body (15) that is movable inside the casing (1) and which is kept in open position against the flow direction by its own weight and/or spring force, in which the flow cross-section, surface area of the reseat body (15) and forces are determined in such a manner that reseat body (15) leaves its open position upon a defined value of the reseat flow and is moved towards the valve seat (16) of the casing (1) so that the gas outlet (2) is closed in the shut position and a manipulator (8), arranged outside of the casing (1), that has a tappet (7) projecting into the casing (1) interior which is used to adjust the spring pre-tension and/or the stroke of the reseat body (15), characterised in that the manipulator (8) is supported by a slide block (12).

2. A gas stream monitor to automatically shut off gas conduits according to patent claim 1, characterised in that die slide block (12) has lock-in positions.

3. A gas stream monitor to automatically shut off gas conduits according to patent claim 2, characterised in that the slide block (12) has a control slope (31) and that, in addition, the tappet (7) is interlocked with the shaft (14) of the reseat body (15) so that an actuation of the manipulator (8) can move the reseat body (15), under the impact of the control slope (31), out of its shut position, with the manipulator (8) automatically leaving the range of action of the control slope (31) after the completed actuation.

4. A gas stream monitor to automatically shut off gas conduits according to one of the patent claim 3, characterised in that connection between manipulator (8) and tappet (7) is adjustable.

5. A gas stream monitor to automatically shut off gas conduits according to one of a the patent claim 4, characterised in that the shut position of the reseat body (15) can be adjusted with the manipulator (8) via the tappet (7) projecting into the interior of the casing (1).

6. A gas stream monitor to automatically shut off gas conduits according to one of the patent claim 5, characterised in that two or more reseat bodies (15) are arranged in parallel inside the casing (1) with each of the reseat bodies (15) being assigned a manipulator (8) with a tappet (7) projecting into the casing (1) interior that facilitates an adjustment of the spring pre-tension and/or the stroke of the reseat body (15).

7. A gas stream monitor to automatically shut off gas conduits according to patent claim 1, characterised in that the slide block (12) has a control slope (31) and that, in addition, the tappet (7) is interlocked with the shaft (14) of the reseat body (15) so that an actuation of the manipulator (8) can move the reseat body (15), under the impact of the control slope (31), out of its shut position, with the manipulator (8) automatically leaving the range of action of the control slope (31) after the completed actuation.

8. A gas stream monitor to automatically shut off gas conduits according to claim 1, characterised in that connection between manipulator (8) and tappet (7) is adjustable.

9. A gas stream monitor to automatically shut off gas conduits according to claim 2, characterised in that connection between manipulator (8) and tappet (7) is adjustable.

10. A gas monitor to automatically shut off gas conduits according to claim 1, characterised in that the shut position of the reseat body (15) can be adjusted with the manipulator (8) via the tappet (7) projecting into the interior of the casing (1).

11. A gas monitor to automatically shut off gas conduits according to claim 2, characterised in that the shut position of the reseat body (15) can be adjusted with the manipulator (8) via the tappet (7) projecting into the interior of the casing (1).

12. A gas monitor to automatically shut off gas conduits according to claim 3, characterised in that the shut position of the reseat body (15) can be adjusted with the manipulator (8) via the tappet (7) projecting into the interior of the casing (1).

13. A gas stream monitor to automatically shut off gas conduits according to claim 1, characterised in that two or more reseat bodies (15) are arranged in parallel inside the case (1) with each of the reseat bodies (15) being assigned a manipulator (8) with a tappet (7) projecting into the casing (1) interior that facilitates an adjustment of the spring pre-tension and/or the stroke of the reseat body (15).

14. A gas stream monitor to automatically shut off gas conduits according to claim 2, characterised in that two or more reseat bodies (15) are arranged in parallel inside the case (1) with each of the reseat bodies (15) being assigned a manipulator (8) with a tappet (7) projecting into the casing (1) interior that facilitates an adjustment of the spring pre-tension and/or the stroke of the reseat body (15).

15. A gas stream monitor to automatically shut off gas conduits according to claim 3, characterised in that two or more reseat bodies (15) are arranged in parallel inside the case (1) with each of the reseat bodies (15) being assigned a manipulator (8) with a tappet (7) projecting into the casing (1) interior that facilitates an adjustment of the spring pre-tension and/or the stroke of the reseat body (15).

16. A gas stream monitor to automatically shut off gas conduits according to claim 4, characterised in that two or more reseat bodies (15) are arranged in parallel inside the case (1) with each of the reseat bodies (15) being assigned a manipulator (8) with a tappet (7) projecting into the casing (1) interior that facilitates an adjustment of the spring pre-tension and/or the stroke of the reseat body (15).

* * * * *